United States Patent [19]

Brenholt

[11] Patent Number: 5,054,721

[45] Date of Patent: Oct. 8, 1991

[54] VERTICAL TAKEOFF AIRCRAFT

[75] Inventor: David L. Brenholt, Menomonie, Wis.

[73] Assignee: Translab, Inc., Menomonie, Wis.

[21] Appl. No.: 327,298

[22] Filed: Mar. 22, 1989

[51] Int. Cl.$^5$ .............................. B64C 3/00
[52] U.S. Cl. .................... 244/903; 244/900; 244/207; 244/210; 244/214; 244/216
[58] Field of Search ............ 244/12.6, 900, 902, 244/903, 15, 123, 146, 904, 207, 23 D, 12.5, 210, 216, 214; 28/210, 216, 214

[56] References Cited

U.S. PATENT DOCUMENTS

| | | | |
|---|---|---|---|
| 1,580,577 | 4/1926 | Baumann | 244/207 |
| 2,046,570 | 7/1936 | Malinowski | 244/904 |
| 2,478,726 | 8/1949 | Trey | 244/207 |
| 3,243,146 | 3/1966 | Clover | 244/23 |
| 3,429,527 | 2/1969 | Whittley | 244/12 |
| 3,640,489 | 2/1972 | Jaeger | 244/23 |
| 3,645,476 | 2/1972 | Haberkorn | 244/12 B |
| 3,703,266 | 11/1972 | Lincks et al. | 244/52 |
| 3,801,048 | 4/1974 | Riccius | 244/42 |
| 3,863,869 | 2/1975 | Bachman | 244/23 |
| 4,085,911 | 4/1978 | Nahodyl | 244/12.4 |
| 4,372,506 | 2/1983 | Cronk et al. | 244/100 |
| 4,392,621 | 7/1983 | Viets | 244/12.5 |
| 4,548,371 | 10/1985 | Dempsey | 244/13 |
| 4,568,043 | 2/1986 | Schmittle | 244/48 |
| 4,596,368 | 6/1986 | Schmittle | 244/48 |
| 4,709,879 | 12/1987 | Stafford | 244/12.5 |
| 4,781,341 | 11/1988 | Kasper | 244/903 |
| 4,848,701 | 7/1989 | Belloso | 244/207 |

Primary Examiner—Joseph F. Peters, Jr.
Assistant Examiner—Christopher P. Ellis
Attorney, Agent, or Firm—Foley & Lardner

[57] ABSTRACT

A vertical takeoff ultralight aircraft having an operator controlled high volume vane axial fan in communication with a conduit configured to direct an air stream produced by the fan to a spanwise air duct disposed forwardly of a wing including an air foil. High velocity air is discharged from the air duct and directed over the upper surface of the air foil. An induced air stream flows upwardly and rearwardly through an air flow path defined by the spanwise air duct and the air foil. The wing and air duct are configured such that the induced air stream joins the air stream discharged from the air duct to create reduced static pressure zone on the upper surface of the wing of sufficient magnitude to effect vertical lift. Fan discharge may be partially deflected rearwardly to provide horizontal thrust.

28 Claims, 5 Drawing Sheets

VERTICAL TAKEOFF AIRCRAFT

TECHNICAL FIELD

The present invention relates, generally, to ultralight vertical takeoff and landing vehicles, and more particularly, to a wing configuration utilizing a pressurized spanwise air duct for inducing blown leading edge augmented vertical lift.

BACKGROUND OF THE INVENTION

Vertical takeoff and landing aircraft (VTOL's) are generally well known. See, for example: Nahodyl U.S. Pat. No. 4,085,911, issued Apr. 25, 1978; Bachman U.S. Pat. No. 3,863,869, issued Feb. 4, 1975; Riccius U.S. Pat. No. 3,801,048, issued Apr. 2, 1974; and Jaeger U.S. Pat. No. 3,640,489, issued Feb. 8, 1972. Simiarly, vertical and short takeoff and landing aircraft (V/STOL's) are also well known. See, Lincks et al. U.S. Pat. No. 3,703,266, issued Nov. 21, 1972 and Haberkorn U.S. Pat. No. 3,645,476, issued Feb. 29, 1972. These apparatus achieve vertical lift by generating a downward thrust of sufficient magnitude to overcome gravitational forces. However, the necessarily large mass and energy consumption requirements of these jet propulsion systems make them impractical and prohibitively expensive for recreational use.

Another well-known method of producing vertical lift involves the use of an airfoil configured to effect more rapid motion of the fluid medium (air) over the upper surface than over the lower surface of a wing during forward motion thereof. As the air velocity along the upper wing surface increases, the static pressure decreases. To the extent a sufficient pressure differential is maintained between the upper and lower surfaces of the wing, vertical lift may be sustained. However, high velocity ram air, corresponding to high forward aircraft velocity, is needed to create an adequate pressure differential. Consequently, conventional airfoil systems are unsatisfactory in circumstances where a runway is unavailable or vertical takeoff is otherwise desirable.

Airfoil systems have been suggested for use in conjunction with vertical thrust systems. See, for example, Clover U.S. Pat. No. 3,243,146, issued Mar. 29, 1966. Moreover, attempts have been made to adapt the Coanda effect to aircraft propulsion. The Coanda effect is defined as the tendency of a fluid stream to "attach" itself to an adjacent surface. See, for example, Whittley U.S. Pat. No. 3,429,527, issued Feb. 25, 1969 and Viets U.S. Pat. No. 4,392,621, issued July 12, 1983. Specifically, a generally horizontal exhaust stream is directed over the upper surface of a wing configured to curve downwardly in the aft direction. The stream tends to attach itself to the curved surface, producing a downward and rearward exhaust stream. Thus, even though the exhaust stream is ejected, for example from a jet engine, in a substantially horizontal plane, the Coanda effect due to the convex wing induces a vertical thrust component.

The disadvantage of the Coanda effect, particularly when used as the sole source of vertical lift, resides in the inability to pump a sufficient volume of air to overcome the gravitational forces associated with jet propulsion systems.

The need to reduce total system mass, and thereby maintain thrust requirements and fuel consumption within reasonable limits, has resulted in the emergence of the ultralight aircraft industry. By keeping gross system weight low, for example under 254 pounds, relatively inexpensive recreational aircraft, using various vertical lift systems, are now available. However, these vehicles are unable to achieve vertical takeoff. See, for example, Cronk et al. U.S. Pat. No. 4,372,506, issued Feb. 8, 1983; Schmittle U.S. Pat. No. 4,595,368, issued June 24, 1986; Dempsey U.S. Pat. No. 4,548,371, issued Oct. 22, 1985; and Schmittle U.S. Pat. No. 4,568,043, issued Feb. 4, 1986.

SUMMARY OF THE INVENTION

The present invention provides a vertical takeoff ultralight aircraft without the use of jet engines or vertical thrusters. In accordance with one aspect of the invention, the vehicle wing is configured with a spanwise pressurized slot spaced forwardly of the leading edge of the wing for producing augmented lift by maximizing airfoil and Coanda effects.

A preferred embodiment of the present invention provides a pair of operator-controlled high volume vane axial fans for controllably discharging an airstream into a vertically disposed supply conduit. When the craft is at rest in the unpowered state, the supply conduit supports a single wing above an operator carriage. In flight, the carriage is suspended from the wing by a series of suspension cables, resulting in a low center of gravity and correspondingly high in-flight stability.

The supply conduit communicates with a spanwise air duct, or P-slot, comprising the leading edge of the wing form. In this context, "spanwise" generally corresponds to the wingspan, or lengthwise direction of the wing. An airfoil is spaced apart from and disposed rearwardly of the spanwise duct. The P-slot discharges a pressurized airstream at the fore edge of the upper surface of the airfoil. A supplemental airstream, induced by the P-slot discharge, flows upwardly and rearwardly through a space defined by the P-slot and the airfoil and joins the P-slot airstream. The combined airstream produces a zone of reduced static pressure on the upper surface of the wing, resulting in a net upward force on the wing of sufficient magnitude to effect vertical takeoff. When the desired altitude is attained, fan discharge is partially diverted rearwardly, placing the vehicle in glide mode.

BRIEF DESCRIPTION OF THE DRAWING

A preferred exemplary embodiment of the present invention will hereinafter be described in conjunction with the appended drawing, wherein like numerals denote like elements.

DETAILED DESCRIPTION OF PREFERRED EXEMPLARY EMBODIMENTS

Figure 1:
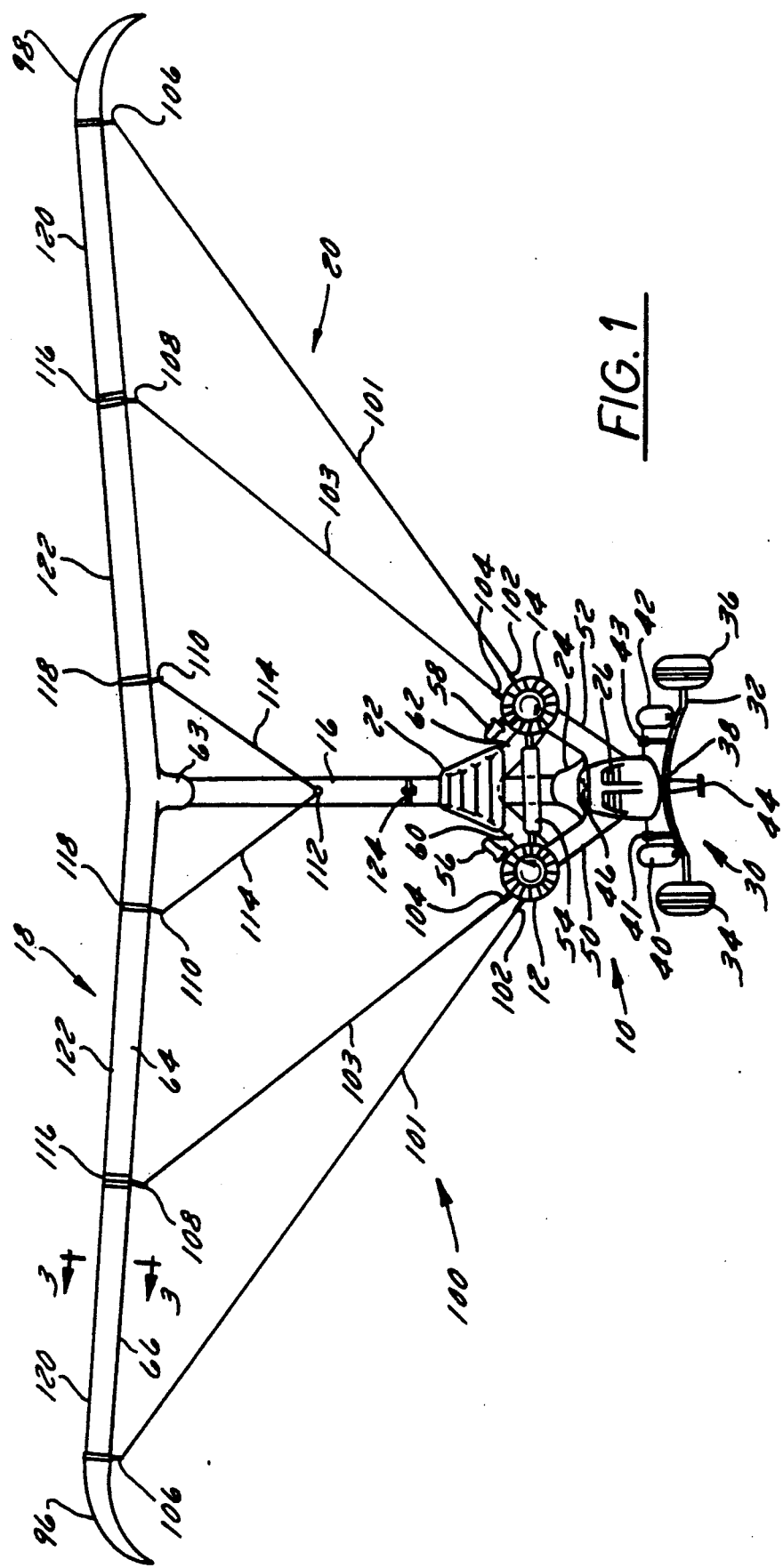
FIG. 1 is a front elevational view of an exemplary embodiment of a vertical takeoff air vehicle in accordance with the present invention, shown in the at rest, unpowered state.
Figure 2:
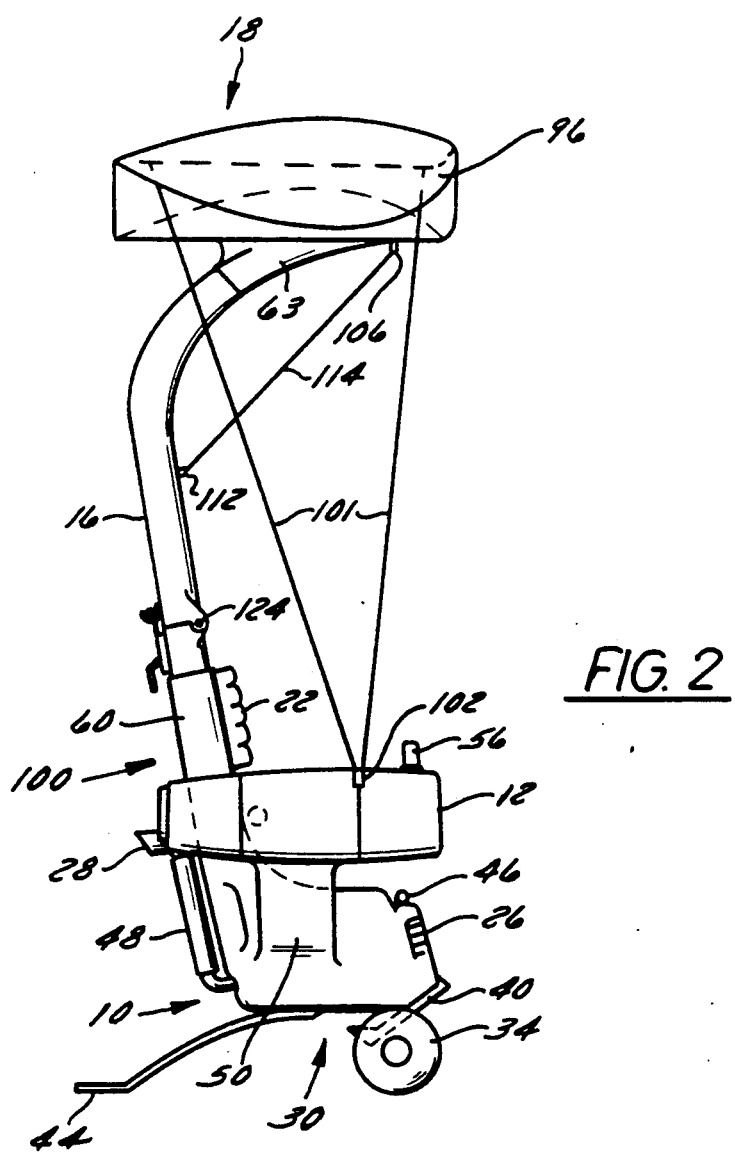
FIG. 2 is a right side elevational view of the air vehicle shown in FIG. 1.

Referring now to FIGS. 1 and 2, a vertical takeoff ultralight aircraft 100 in accordance with the present invention comprises a carriage 10, respective fans 12, 14, a supply conduit 16, a wing 18, and a suspension system 20.

Carriage 10 suitably comprises a back cushion 22, a loin support 24, a power plant housing 26, an exhaust pipe 28, and an undercarriage 30. In a preferred embodiment, carriage 10 is configured such that the operator's legs straddle loin support 24, the operator thereby assuming a generally erect position. Alternatively, loin support 24 may be in the form of a seat. Undercarriage 30 advantageously comprises a cross bar 32, upon which respective wheels 34, 36 are rotatably mounted.

In a preferred embodiment, cross bar 32 illustratively comprises a unidirectional fiberglass spring for absorbing impact upon landing; alternatively, cross bar 32 may be a conventional axle utilizing spring, pneumatic, or hydraulic shock absorbers. Cross bar 32 is securely attached to the underside of carriage 10, for example by bolts or rivets (not shown) at a cross bar attachment junction 38.

A medial support member 44 extends rearwardly from undercarriage 30 for supporting vehicle 100 on the ground. Member 44 may be comprised of fiberglass to facilitate shock absorbtion during landing.

In an alternate embodiment, wheels 34, 36 and support member 44 may be omitted entirely and a skid mechanism, similar to that used on conventional helicopters, used in lieu thereof.

A first glide turn pedal 40 is pivotally mounted to cross bar 32 between junction 38 and wheel 34; a second glide turn pedal 42 is pivotally mounted to cross bar 32 between junction 38 and wheel 36. Respective cable mechanisms 41, 43 cooperate with pedals 40, 42, which are spring loaded upwardly, to effect opening and closing of wing-mounted ram air ducts, as described below. During the glide phase of flight, for example, depression of the left pedal causes the craft to turn left; depression of the right pedal causes the craft to turn right, as desired. Simultaneous depression of both pedals reduces forward velocity and maximizes lift during landing.

With continued reference to FIGS. 1 and 2, power plant housing 26 houses a suitable power plant (not shown), for example a two or three cylinder, thirty-five horsepower piston engine of the type used in snowmobiles and ultralight aircraft. Because of the relatively low air speeds experienced by vehicle 100, a liquid cooled engine is preferred over an air cooled engine. A recoil start mechanism 46 may be conveniently disposed at the forward portion of engine housing 26. Exhaust pipe 28, conveniently disposed rearwardly of carriage 10, may include a muffler 48, as desired.

Fans 12 and 14 are supported by respective drive housings 50, 52 extending from carriage 10. In a preferred embodiment, fans 12 and 14 are shaft driven by respective drive shafts (not shown) extending from the engine to each fan and disposed interiorly of respective drive housings 50, 52. Alternatively, respective belt drive systems, also disposed within drive housings 50, 52, may be employed. A stablizer bar 54 connects fans 12 and 14 and also serves as a an anterior restraining bar, or back rest, for the operator.

Respective fans 12, 14 each comprise a first cable mount 102, for attaching a first pair of cables 101 thereto, and a second cable mount 104 for attaching a second pair of cables 103 thereto.

A control handle 56, disposed in a track extending lengthwise on fan 12, controls a shutter (not shown) disposed near the rear portion and interiorly of fan 12. The shutter comprises a plurality of spaced apart, pivotally mounted panels. As the operator urges handle 56 forward in its track, suitable connecting mechanism (not shown) causes the shutter panels to assume an open position, and the output airstream generated by fan 12 is therefore ejected rearwardly from fan 12 in an unobstructed manner, resulting in a generally forward thrust vector. As handle 56 is drawn in the aft direction, the shutter panels simultaneously pivot into an overlapping, or closed relationship, thereby deflecting the fan output into supply conduit 16 to produce vertical lift, as explained below. Control handle 58 controls fan 14 in a similar manner.

Accordingly, when handles 56, 58 are in the forward position, all fan output is directed rearwardly. When both handles are in the aft position, all fan output is diverted upwardly to produce vertical lift. When both handles are positioned in the middle region of their respective tracks, a portion of fan output is directed rearwardly to contribute to horizontal thrust and the remaining portion contributes to vertical lift, as desired. When the position of one handle is more forward than the other, a condition indicating that one fan is generating a greater horizontal thrust vector than the other fan, the vehicle will turn in the direction of the forward handle. This configuration minimizes unwanted tilting effects inasmuch as the output from each fan may be directed into a common supply conduit and thereafter directed over the surface of the entire wing span.

Figure 7:
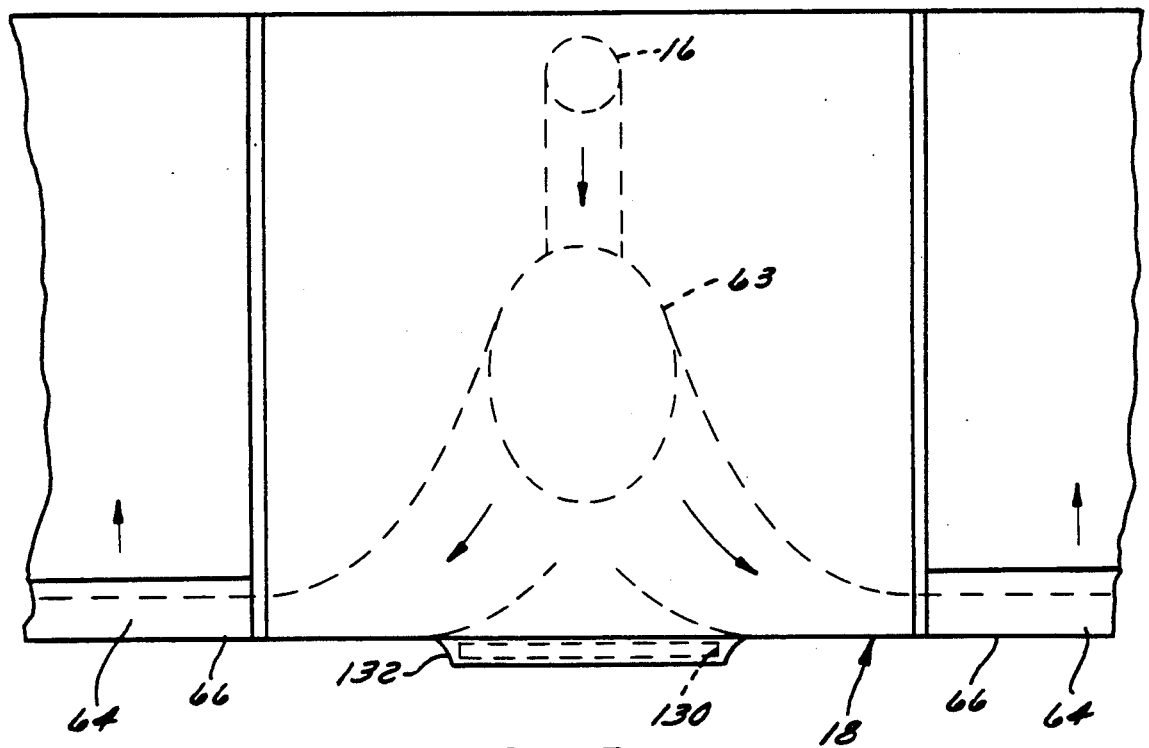
FIG. 7 is a top plan view of an exemplary thrust reverse valve.

With particular reference to FIGS. 1 and 7, the turbine in fan 12 is disposed to rotate counterclockwise and the turbine in fan 14 is disposed to rotate clockwise. The swirling output from respective fans 12, 14 is directed from the rear portions thereof into supply conduit 16 via respective transfer ducts 60, 62. The above-described counter-rotation of the fans minimizes pressure losses incurred in diverting the airflow upwardly into supply conduit 16. Supply conduit 16 terminates at, and communicates with, a spanwise air duct 64 (P-slot 64), comprising the leading edge 66 of wing 18, at an unobstructed diffuser unction 63.

Figure 3:
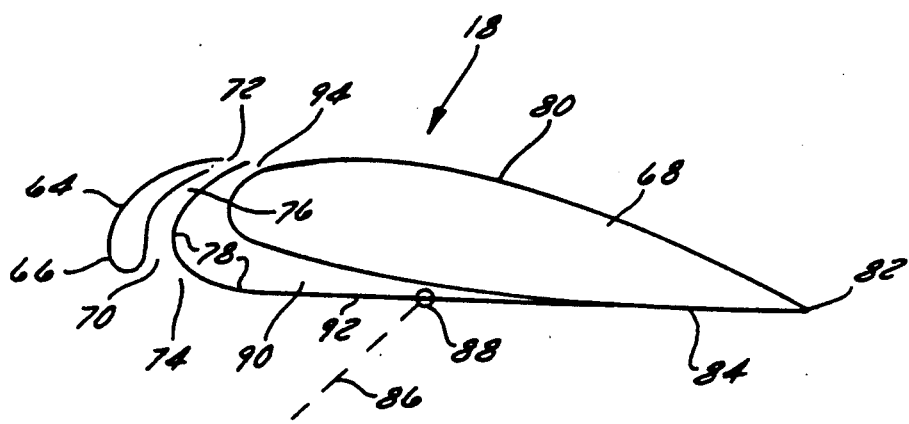
FIG. 3 is a cross-sectional view of an exemplary wing configuration in accordance with the present invention, taken along line 3—3 of FIG. 1.
Figure 4:
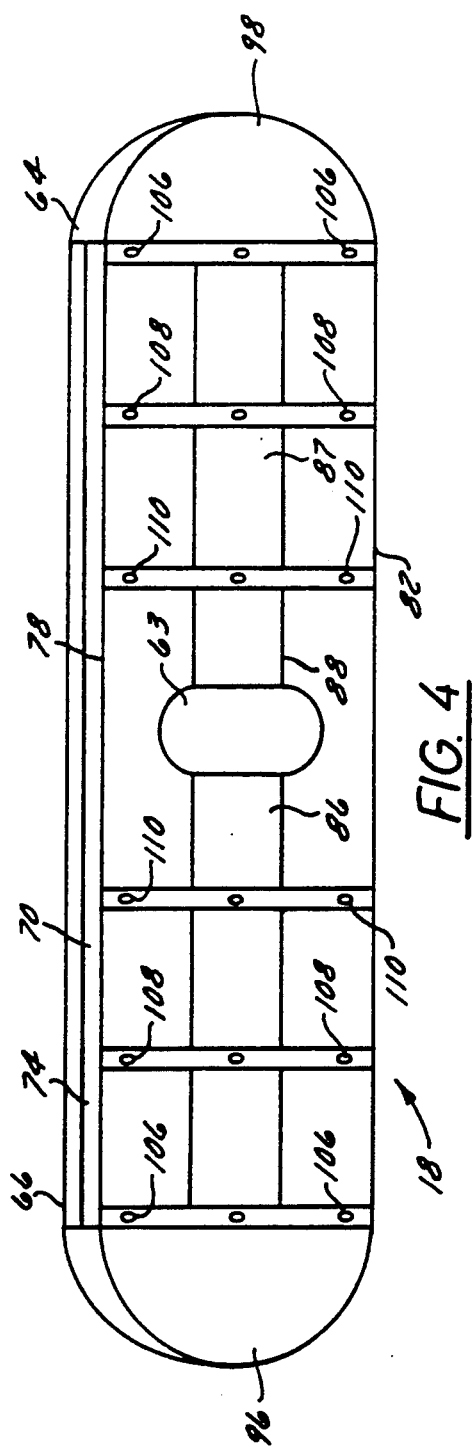
FIG. 4 is a bottom view of an exemplary wing configuration.

Referring now to FIGS. 3 and 4, wing assembly 18 advantageously comprises an airfoil 68 and spanwise duct 64 spaced apart from and forwardly of airfoil 68. P-slot 64 includes a first discharge jet 72 and is spaced apart from airfoil 68, secured to airfoil 68 by, for example, a series of brackets which are spaced apart in the spanwise direction. For clarity, the brackets are omitted from the drawing.

The region between P-slot 64 and airfoil 68 generally defines a spanwise induced air slot 70 having an inlet 74 and a second jet 76 proximate to and downstream of first jet 72.

Airfoil 68 suitably includes a forward edge 78, a curved top surface 80, a trailing edge 82, and a generally flat bottom surface 84. A ram air duct 86, shown in phantom lines in FIGS. 1 and 3, is pivotally attached to bottom surface 84 at a spanwise hinge 88. Ram air duct 86 is spring loaded in the closed position (flush with bottom surface 84), and may be opened by the operator by depressing pedal 40. A similarly configured ram air duct 87, operated by pedal 42, is disposed under wing 18 on the opposite side of supply conduit 16.

When pedal 40 (see FIG. 1) is depressed, cable mechanism 41 actuates mechanically amplified linkage (not shown), which may be disposed within housing 26, to open ram air duct 86 and thereby expose a ram air cavity 90. Cavity 90 decreases in cross-sectional area from a ram inlet 92 to a third jet 94. When pedal 40 is released, ram air duct 86 pivots about hinge 88 into the closed position, covering cavity 90.

Referring now to FIGS. 1, 2 and 4, wing 18 further comprises respective oppositely disposed curved wing tips 96, 98, and a plurality of wing-mounted cable attachments for attaching suspension system 20 to wing 18.

Suspension system 20 comprises respective first cables 101, respective second cables 103, and respective duct cables 114. With particular reference to FIG. 2 and the right side of FIG. 1, duct cable 114 extends from a medial cable support 112, disposed on supply conduit 16, to a wing-mounted duct cable support 110, disposed near the forward portion of the underside of wing 18. First cables 101 are secured to respective first wing-mounted cable supports 106, one of which is disposed near the forward edge of the underside of wing 18 near curved wing tip 98, the other being disposed near the rearward edge of the underside of wing 18 near curved tip 98. First cables 101 extend from first wing-mounted cable supports 106 to first cable mount 102 on fan 14.

Second cables 103 extend from second cable mount 104 on fan 14 to respective second wing-mounted cable supports 108 disposed on the underside of wing 18 between first cable supports 106 and duct cable support 110. Cable supports 108 are also disposed, respectively, near leading edge 66 and trailing edge 82 on the underside of wing 18. A suspension system which is symmetric with respect to that described above in connection with the right side of FIG. 1 is disposed under the opposite side of wing 18.

In the unpowered state, i.e., when vehicle 100 is stationary on the ground, wing 18 is supported by supply conduit 16. When vehicle 100 is airborne, either in the lift or glide mode, carriage 10 and supply conduit 16 are suspended from wing 18 by suspension system 20.

Figure 5:
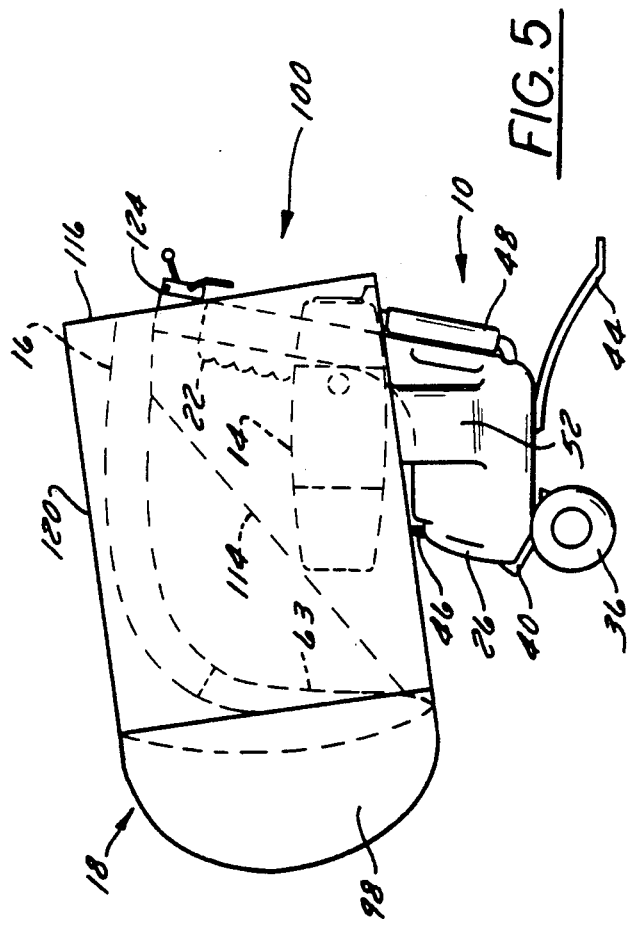
FIG. 5 is a left side elevational view of an exemplary air vehicle shown in the folded, storage position.

Referring now to FIGS. 1, 2 and 5, vehicle 100 may be folded into a compact configuration for convenient moving and storage. For this purpose, respective first and second wing hinges 116, 118 are disposed on wing 18 to permit respective first and second wing panels 120, 122, to be folded into an overlapping relationship. Folding in this manner slackens the cables so that they need not be removed during folding and unfolding. Alternatively, cables 101 and 103 may be removed prior to folding and reattached during reassembly of vehicle 100. A conduit hinge 124 is provided on supply conduit 16 to facilitate forward pivoting of the upper portion of conduit 116 and wing 18. In the folded position shown in FIG. 5, support member 44 may be lifted and vehicle 100 rolled on wheels 34, 36, as desired.

Referring now to FIGS. 1 and 3, flight mode is initiated by starting the engine, for example by pulling recoil start mechanism 46. Handles 56, 58 are pulled rearwardly, thereby closing the internal shutters and diverting all output from both fans into conduit 16. The pressurized air is diverted at junction 63 into spanwise air duct (P-slot) 64.

With particular reference to FIG. 3, pressurized air is discharged from P-slot 64 through jet 72 and directed toward the upper surface of airfoil 68 proximate forward edge 78. The Coanda effect (the tendency of a fluid stream to attach itself to and follow the contour of an adjacent surface) suggests that the pressurized airstream leaves jet 72 and follows curved upper surface 80 of airfoil 68, thereby reducing static pressure above wing 18. The extent to which static pressure may be reduced is a function of, inter alia, the mass flow rate of the air over airfoil 68.

The mass flow rate over surface 80 may be increased by an induced airstream flowing through slot 70. The high velocity airstream leaving jet 72 produces a localized region of low static pressure near induced air jet 76. The static pressure at induced air inlet 74 being approximately equal to atmospheric pressure, an induced airstream flows, from high to low pressure, from induced air inlet 74, through slot 70, and is ejected therefrom at discharge jet 76. This induced airstream further decreases static pressure over wing 18, thereby augmenting lift.

The point between forward edge 78 and trailing edge 82 at which the airstream discharged from jet 72 attaches to surface 80 is not known. However, the Coanda effect suggests that as the induced airflow from jet 76 increases, the point of attachment of the combined streams from P-slot 64 and induced slot 70 moves downstream toward trailing edge 82 of airfoil 68. The region on surface 80 between the point of Coanda attachment and jets 72, 76 constitutes an enhanced zone of reduced static pressure. Accordingly, during the vertical lift phase of flight, the pressurized leading edge (P-slot) and induced augmented lift systems reduce static pressure above the wing by an amount sufficient to maintain a pressure differential (above and below the wing) sufficient to lift the vehicle vertically upward.

When vehicle 100 reaches the desired altitude, the operator urges handles 56, 58 forward to initiate glide mode. As the internal fan discharge shutters open in response to forward movement of handles 56, 58, fan output is directed rearwardly, producing forward thrust. As forward velocity increases, ram air impinges upon leading edge 66 of wing 18, resulting in conventional airfoil vertical lift. Simultaneous manipulation of handles 56, 58 allows the operator to selectively apportion fan output between vertical lift and horizontal thrust, as desired. Moreover, total aggregate fan output is controlled, for example, by rotation of handle 56 in much the same way a motorcycle throttle controls engine speed. Alternatively, fans 12, 14 may be shut off when sufficient altitude is reached, thereby placing the vehicle in glide mode. The engine may be restarted in flight, as desired for powered landing or further climbing.

As previously discussed, foot pedals 40 and 42 control ram air ducts 86 and 87, respectively. Depression of pedal 40 causes duct 86 to open as shown in phantom lines in FIG. 3. Ram air is thus entrapped by ram air duct 86, ingested by cavity 90 at ram air cavity inlet 92, and expelled through ram air discharge jet 94. Because the cross sectional area of ram air cavity 90 decreases from inlet 92 to discharge orifice 94, the air stream is expelled at high pressure and high velocity. The air stream leaving jet 94 complements the air streams from jets 72 and 76 to thereby enhance vertical lift. Pedal 42 controls ram air duct 87 in a similar manner.

When both ram air ducts 86, 87 are open, drag is maximized, forward thrust is correspondingly retarded, and ram air duct-induced lift is maximized. This corresponds to the landing position of ram air ducts 86, 87. Alternatively, when only one ram air duct is open, forward drag is increased on that side only, causing the vehicle to turn in the direction of the open duct. Additional turning power may be employed by moving one of handles 56, 58 forward with respect to the other one, as discussed above.

In conventional airfoil systems, the pressure differential above and below the airfoil is a function of, inter alia, the angle of inclination between the plane of bottom surface 84 and the relative wind vector. When this "attack angle" reaches a predetermined maximum, e.g., eighteen to twenty degrees, the pressure differential falls sharply, resulting in in-flight stall.

The likelihood of in-flight stall is minimized in accordance with one aspect of the present invention inasmuch as the angle of attack of the combined air streams from P-slot 64 and induced air slot 70 are fixed with respect to forward edge 78 of airfoil 80. However, although the magnitude of the differential pressure above and below the wing (the "lift" vector) remains substantially constant as the angle of inclination of the wing changes with respect to the horizontal, the direction of the lift vector deviates from the vertical commensurate with wing inclination.

In accordance with another aspect of the present invention, the cross sectional area of the P-slot is configured to decrease from the wing center to the wing tip, thereby compensating for pneumatic resistance and ensuring a uniform discharge pressure at the P-slot jet.

Figure 6:
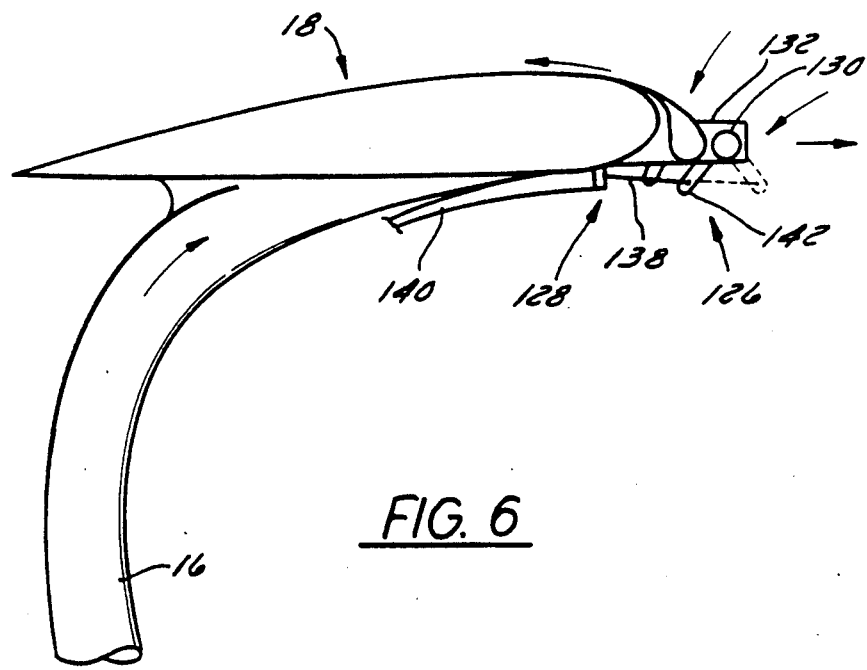
FIG. 6 is a right side view of an exemplary thrust reverse mechanism.
Figure 8:
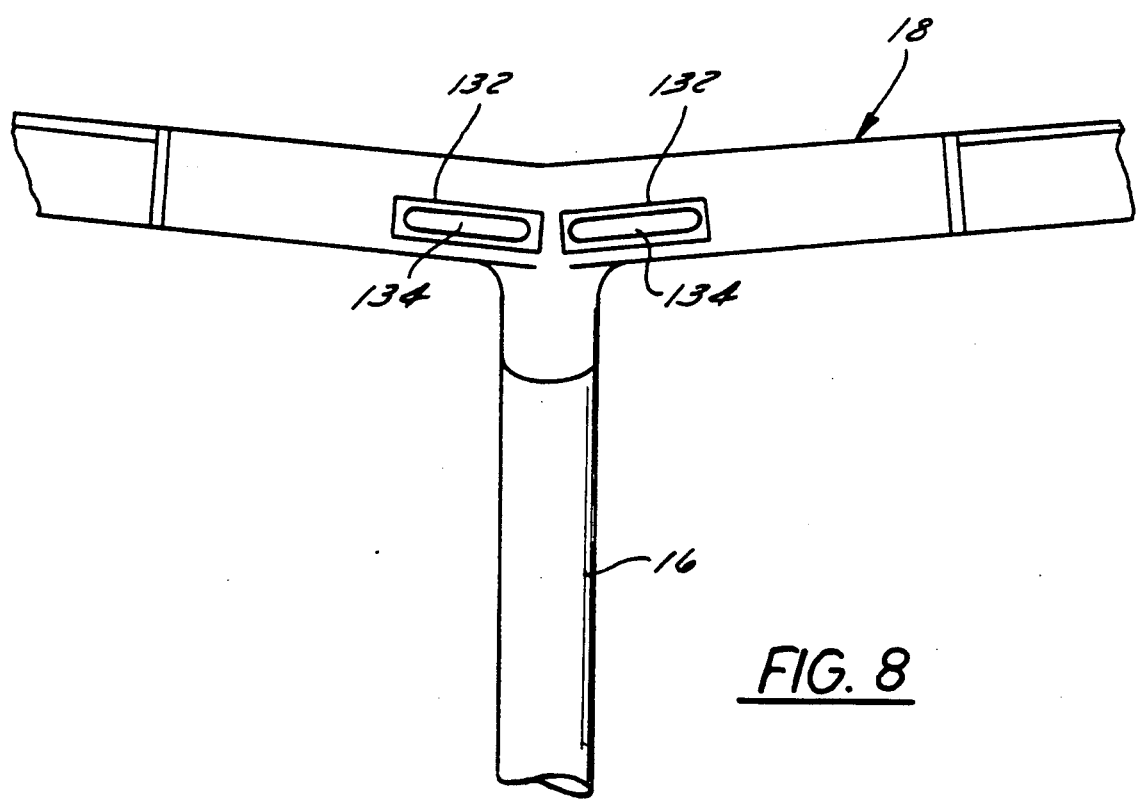
FIG. 8 is a front view of the thrust reverse valve of FIGS. 6 and 7.

Referring now to FIGS. 6-8, an alternate preferred embodiment of the invention includes a thrust reverse mechanism 126 comprising an actuation assembly 128, a reversing valve 130, and a valve housing 132. For clarity, actuation assembly 126 is omitted from FIGS. 7 and 8. Valve 132 suitably comprises a rotatably mounted cylinder having a longitudinal slot (not shown) extending diametrically therethrough. Valve housing 132 includes respective foreword-facing slots 134 (FIG. 8). Thrust reverse mechanism 126 is configured such that, in the open position, reversing valve 130 communicates with diffuser 63 and slots 134 to expel fan output forwardly. In the (normally) closed position, fan output is directed into P-slot 64, as described above in conjunction with FIG. 3.

Reversing valve 130 is opened and closed by actuator assembly 128 (FIG. 6), comprising an actuator cable 130, a cable sheath 140, and a thrust actuator lever 142. Cable and sheath 140 extend along supply conduit 16 and cooperate, for example, with a hand or foot mechanism (not shown) proximate carriage 10. For example, cable 138 may be spring loaded such that thrust reverse valve 130 is in the closed position, and may be opened by a brake-type handle mechanism (not shown) on control knob 58 of the type used in conventional clutch or brake handles on motorcycles.

Thrust reverse mechanism 126 is particularly advantageous in situations where insufficient clearance is available for a powered turn. For example, if craft 100 approaches a building and the operator desires to back away therefrom, reverse thruster 126 is opened, thereby directing fan output forwardly, generating reverse thrust. Having backed away from the obstruction, reverse thruster 126 may then be closed and normal flight mode resumed.

It will be understood that the above description is of a preferred exemplary embodiment of the present invention, and that the invention is not limited to the specific forms shown. For example, an air compressor, or any other suitable mechanism for generating an air stream may be employed in lieu of fans. Similarly, batteries or other power sources may be used in lieu of a piston engine, particularly when the apparatus is made as a small scale model, toy, or amusement device. Various other substitutions, modifications, changes, and omissions may be made in the design and arrangement of the elements without departing from the spirit of the invention as expressed in the appended claims.

I claim:

1. A vertical takeoff ultralight aircraft, comprising:
    compressor means for generating a gas stream;
    a conduit, cooperating with said compressor means, for directing said gas stream;
    a wing assembly, comprising:
        an airfoil having a fore edge, an aft edge, a bottom surface, and a curved top surface; and
        spanwise ducting means, spaced apart from and disposed forwardly of said airfoil and communicating with said conduit, for discharging said gas stream proximate said airfoil fore edge such that said gas stream flows over said curved top surface of said airfoil in a predetermined manner and creates a zone of reduced static pressure above said wing.

2. The aircraft of claim 1, wherein said compressor means further comprises:
    throttle means for selectively varying the rate at which said gas stream is generated;
    guide means for selectively diverting said gas stream into said conduit; and
    control means for selectively controlling said guide means, said control means being configured for adjustment between at least a first and second position.

3. The aircraft of claim 2, wherein said compressor means comprises a vane axial fan configured to eject said gas stream rearwardly.

4. The aircraft of claim 3, wherein said guide means comprises a plurality of shutters disposed rearwardly of said fan and configured to divert a portion of said gas stream into said conduit in accordance with said position of said control means.

5. The aircraft of claim 1, further comprising a carriage configured to accommodate a human operator, and wherein said conduit extends vertically upward from said carriage.

6. The aircraft of claim 5, wherein said carriage comprises first and second supports and said compressor means comprises first and second vane axial fans mounted on said first and second supports, respectively, and wherein said first fan generates a rearwardly discharged first air stream and said second fan generates a rearwardly discharged second air stream.

7. The aircraft of claim 6, wherein:
    said first fan includes a first control means configured for adjustment between at least two settings, for controlling a first guide means for selectively diverting a portion of said first air stream into said conduit in accordance with the position of said first control means; and
    said second fan includes a second control means, configured for adjustment between at least two settings, for controlling a second guide means for selectively diverting a portion of said second air stream into said conduit in accordance with the position of said second control means; and wherein said first and second air streams combine in said conduit to form said gas stream.

8. The aircraft of claim 7, wherein:
said carriage and said conduit are disposed between said first and said second fans;
said conduit comprises:
 a first fan inlet for receiving said first air stream;
 a second fan inlet for receiving said second air stream;
 a junction for communicating with said spanwise duct; and
 an elongated passageway connecting said junction to said first and second fan inlet;
and
 wherein said first and second fans are configured to rotate in opposite directions.

9. The aircraft of claim 1, wherein said ducting means is disposed spaced apart from said airfoil fore edge, to define a slot between said ducting means and said airfoil fore edge, said slot being disposed to generate induced airflow over said top surface of said airfoil.

10. The aircraft of claim 1, wherein said wing further comprises slot means for generating induced airflow over said curved top surface of said airfoil when said spanwise ducting means discharges said ga stream.

11. The aircraft of claim 10, wherein said spanwise ducting means comprises a first spanwise discharge jet for discharging said gas stream and said slot means comprises a second spanwise discharge jet disposed rearwardly of said first discharge jet, and said wing is configured such that said discharged gas stream induces said induced airflow.

12. The aircraft of claim 1, wherein said spanwise ducting means comprises:
 an elongated duct mounted to said airfoil;
 junction means disposed approximately midway along the length of said duct for communicating with said conduit means; and
 wherein the cross sectional area of said duct increases along the length thereof from said junction means to each end of said duct such that said gas stream is discharged therefrom at a substantially uniform pressure and flow.

13. The aircraft of claim 1, further comprising a carriage for supporting said conduit means and said compressor means.

14. The aircraft of claim 13, wherein said carriage is suspended from said wing by a plurality of cables, extending from and attached to said wing, when said aircraft is airborne.

15. The aircraft of claim 1, wherein said conduit is disposed to support said wing when said aircraft is on the ground.

16. The aircraft of claim 13, wherein said carriage comprises an undercarriage for engaging the ground during takeoff and landing.

17. The aircraft of claim 16, wherein said undercarriage includes a resiliently flexible member extending from said carriage.

18. The aircraft of claim 16, wherein said undercarriage comprises a rotatable wheel mounted to said carriage by a resiliently flexible member.

19. The aircraft of claim 1, wherein said airfoil includes ram means for selectively engaging ram air.

20. The aircraft of claim 19, wherein said ram means comprises:
 a ram air cavity substantially disposed interiorly of said airfoil; and
 a ram air door hingedly connected to said bottom surface of said airfoil, disposed to cover said cavity when in a closed position in substantially planar relation with said bottom surface of said airfoil, and to expose said cavity when in an open position.

21. The aircraft of claim 20, wherein said ram means further comprises ram air discharge means for discharging said ram air proximate said curved upper surface of said airfoil.

22. The aircraft of claim 21, wherein said ram air discharge means communicates with said cavity and comprises a ram discharge jet disposed rearwardly of said gas stream jet.

23. The aircraft of claim 19, further comprising actuator means for selectively controlling said ram means.

24. The aircraft of claim 23, wherein said actuator means comprises a pedal, pivotally mounted on said carriage, for opening and closing said ram means.

25. The aircraft of claim 1, further comprising reversing means, cooperating with said gas stream, for selectively diverting said gas stream forwardly.

26. A vertical takeoff and landing craft, comprising:
 a power plant configured to eject a high velocity air stream;
 a wing assembly including an airfoil and a spanwise pressurized slot spaced apart from and disposed forwardly of said airfoil; and
 conduit means, communicating with said power plant and said pressurized slot, for guiding said air stream from said power plant to a forward edge of said airfoil;
 wherein said pressurized slot and said airfoil are configured to generate a zone of reduced static pressure above said airfoil of sufficient magnitude to induce vertical lift of said craft when said air stream flows through said conduit means.

27. A vertical takeoff and landing ultralight aircraft, comprising:
 a carriage including an engine and an engine housing;
 a support member extending from said carriage;
 a fan mounted on said support member and powered by said engine;
 a supply conduit extending vertically upwardly from said carriage and communicating with said fan;
 a wing supported by said supply conduit, comprising a spanwise airfoil, a spanwise duct, and an air inlet junction configured to maintain communication between said spanwise duct and said supply conduit.

28. A vertical takeoff ultralight aircraft, comprising:
 a compressor means for generating a gas stream;
 a conduit, cooperating with said compressor means, for directing said gas stream;
 a wing assembly, comprising:
  an airfoil having a fore edge, an aft edge, a bottom surface, and a curved top surface; and
  spanwise ducting means, spaced apart from and disposed forwardly of said airfoil and communicating with said conduit, for discharging said gas stream proximate said airfoil fore edge such that said gas stream flows over said curved top surface of said airfoil in a predetermined manner and creates a zone of reduced static pressure above said wing;
 a rotatably mounted reversing valve cooperating with said gas stream for selectively diverting said gas stream forwardly; and
 a reverse actuator including a cable connected to said reversing valve.

* * * * *